(12) United States Patent
Burstein

(10) Patent No.: US 11,798,181 B2
(45) Date of Patent: *Oct. 24, 2023

(54) METHOD AND SYSTEM FOR LOCATION DETECTION OF PHOTOGRAPHS USING TOPOGRAPHIC TECHNIQUES

(71) Applicant: Synchronoss Technologies, Inc, Bridgewater, NJ (US)

(72) Inventor: Michael Burstein, San Jose, CA (US)

(73) Assignee: Synchronoss Technologies, Inc, Bridgewater, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/688,499

(22) Filed: Mar. 7, 2022

(65) Prior Publication Data

US 2022/0335635 A1 Oct. 20, 2022

Related U.S. Application Data

(63) Continuation of application No. 16/731,556, filed on Dec. 31, 2019, now Pat. No. 11,270,449.

(51) Int. Cl.
*G06T 7/50* (2017.01)
*G06T 7/10* (2017.01)
*G06T 7/70* (2017.01)

(52) U.S. Cl.
CPC .......... *G06T 7/50* (2017.01); *G06T 7/10* (2017.01); *G06T 7/70* (2017.01); *G06T 2207/30181* (2013.01); *G06T 2207/30244* (2013.01)

(58) Field of Classification Search
CPC .... G06T 7/50; G06T 7/10; G06T 7/70; G06T 2207/3018
See application file for complete search history.

(56) References Cited

U.S. PATENT DOCUMENTS

| | | | |
|---|---|---|---|
| 11,270,449 B2 * | 3/2022 | Burstein | ............ G06T 7/10 |
| 2019/0306416 A1 | 10/2019 | Akahane | |
| 2019/0362549 A1 | 11/2019 | Impera et al. | |
| 2020/0074839 A1 | 3/2020 | Trigg | |
| 2020/0098185 A1 | 3/2020 | Schradin et al. | |

* cited by examiner

*Primary Examiner* — Myron Wyche
(74) *Attorney, Agent, or Firm* — Banner & Witcoff, Ltd.

(57) ABSTRACT

A computer implemented method and system for identifying locations in photographs using topographic techniques is disclosed. The method comprises receiving an image; in response to receiving the image, generating a depth map of the image; removing non-geographic features from the depth map; generating a topographic map based on the depth map; modifying the topographic map to represent each pixel by height differential; and comparing the modified topographic map to a modified global topographic map to determine a location of the image.

18 Claims, 3 Drawing Sheets

METHOD AND SYSTEM FOR LOCATION DETECTION OF PHOTOGRAPHS USING TOPOGRAPHIC TECHNIQUES

CROSS-REFERENCE TO RELATED APPLICATION

This application is a continuation of U.S. Non-Provisional application Ser. No. 16/731,556 filed Dec. 31, 2019, issued as U.S. Pat. No. 11,270,449 on Mar. 8, 2022, entitled "Method and System for Location Detection of Photographs Using Topographic Techniques". The content of the above application is incorporated by reference and its entirety.

BACKGROUND

Embodiments of the present invention generally relate to location identification and more specifically to a method for identifying locations in photographs using topographic techniques.

Today, some digital photographs are tagged with global positioning system (GPS) location data. However, many images do not have the GPS location data because either the GPS location data was stripped for privacy reasons or the photograph was taken with a non-GPS enabled camera.

Therefore, there is a need for a method for identifying locations in photographs using topographic techniques

SUMMARY OF INVENTION

A system and/or method is provided for identifying locations in photographs using topographic techniques substantially as shown in and/or described in connection with at least one of the figures.

These and other features and advantages of the present disclosure may be appreciated from a review of the following detailed description of the present disclosure, along with the accompanying figures in which like reference numerals refer to like parts throughout.

Figure 1:
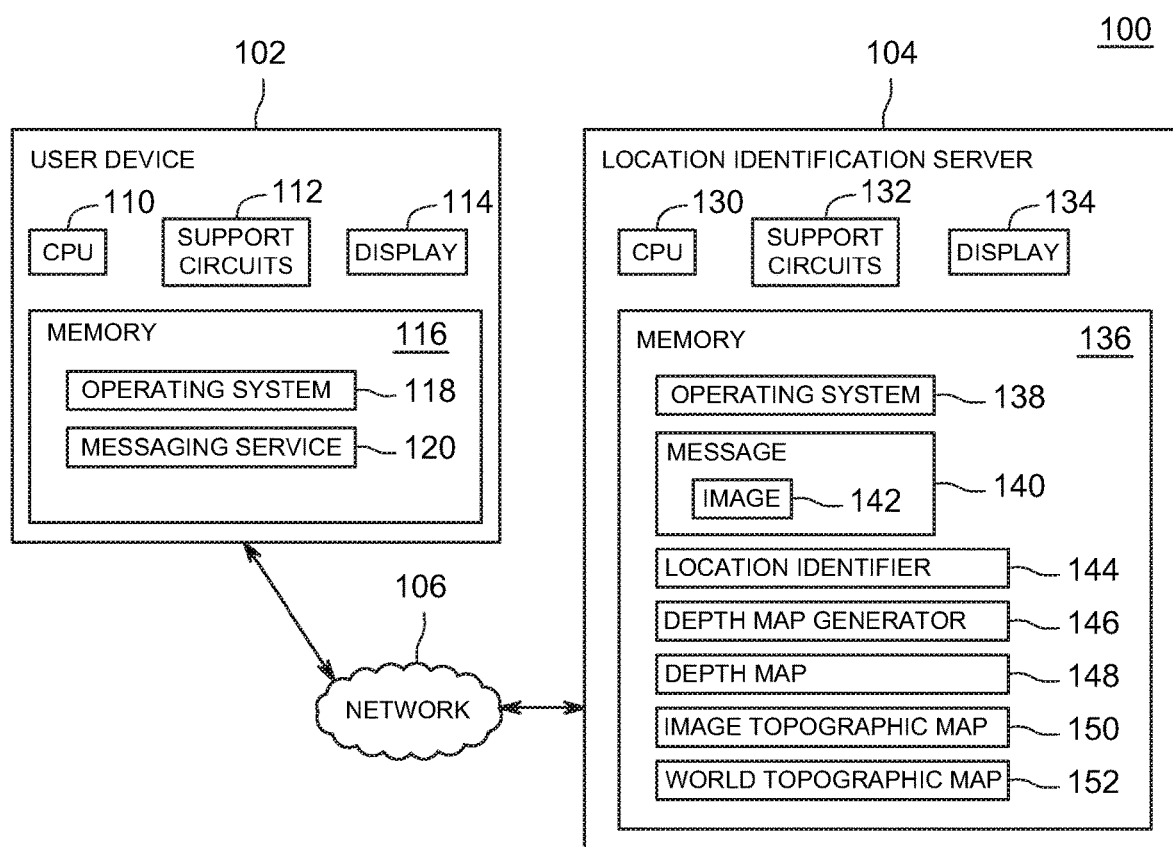
FIG. 1 depicts a block diagram of a system for identifying locations in photographs using topographic techniques, according to one or more embodiments of the invention.

While the method and system for identifying locations in photographs using topographic techniques is described herein by way of example for several embodiments and illustrative drawings, those skilled in the art will recognize that the method and system for identifying locations in photographs using topographic techniques is not limited to the embodiments or drawings described. It should be understood that the drawings and detailed description thereto are not intended to limit embodiments to the particular form disclosed. Rather, the intention is to cover all modifications, equivalents and alternatives falling within the spirit and scope of the method and system for identifying locations in photographs using topographic techniques defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF THE INVENTION

Techniques are disclosed for a system and method for identifying locations in photographs using topographic techniques, according to embodiments of the invention. When a user sends a message, for example an email that includes an image, the image is extracted from the message. If the image includes location information, such as global positioning system (GPS) coordinates, the coordinates may be stored with the image for training of machine learning models. However, if the image does not include location information, a depth map is generated that identifies how far each pixel of the image is from the camera lens used to capture the image and the height of the image from ground level. Any object that is too small to be a geographic feature is removed. At this point, there are outlines and gaps. The image is then rotated 90 degrees vertically to look down on the image and the gaps are filled in with heights and distances based on other parts of the image. The resulting topographic map is then modified with squares of the image represented at a set of differentiating heights. The modified topographic map is then compared with a topographic map of the world. The most likely match between the modified topographic map and the area of the topographic map of the world is determined to be the location in the image.

Various embodiments of a method and system for identifying locations in photographs using topographic techniques are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 depicts a block diagram of a system 100 for identifying locations in photographs using topographic techniques, according to one or more embodiments of the invention. The system 100 includes a user device 102 and a location identifier server 104, communicatively coupled via network 106. The user device 102 is a computing device, such as a desktop computer, laptop, tablet computer, Smartphone, smartwatch or other wearable, smart speaker with a screen, and the like. The user device 102 includes a Central Processing Unit (CPU) 110, support circuits 112, a display 114, and a memory 116. The CPU 110 may include one or more commercially available microprocessors or microcontrollers that facilitate data processing and storage. The various support circuits 112 facilitate the operation of the CPU 110 and include one or more clock circuits, power supplies, cache, input/output circuits, and the like. The memory 116 includes at least one of Read Only Memory (ROM), Random Access Memory (RAM), disk drive storage, optical storage, removable storage and/or the like. The memory 116 includes an operating system 118, and a messaging service 120. The operating system 118 may include various commercially known operating systems. The messaging service 120 may be any form of messaging service capable of transmitting the video content 122 to the location identification server 104. In some embodiments, the messaging service 120 is a native messaging app on the user device 102. In some embodiments, the messaging service 120 is a mobile application downloaded to the user device 102 from an app store (not shown). In some embodiments, the messaging service 120 is provided through a browser.

The location identifier server 104 may be in the cloud. Examples of the location identification server 104 include, but are not limited to a blade server, virtual machine, and the like. In some embodiments, the location identifier server 104 is integrated with an email platform, multimedia messaging service (MMS) platform or other messaging platform. The location identifier server 104 includes a Central Processing Unit (CPU) 130, support circuits 132, a display 134, and a memory 136. The CPU 130 may include one or more commercially available microprocessors or microcontrollers that facilitate data processing and storage. The various support circuits 132 facilitate the operation of the CPU 130 and include one or more clock circuits, power supplies, cache, input/output circuits, and the like. The memory 136 includes at least one of Read Only Memory (ROM), Random Access Memory (RAM), disk drive storage, optical storage, removable storage and/or the like. The memory 136 includes an operating system 138. The operating system 138 may include various commercially known operating systems. The memory 136 also includes a message 140, a location identifier 144, a depth map generator 146, a depth map 148, an image topographic map 150, and a global topographic map 152. The message 140 includes an image 142. The global topographic map 152 is a topographic map of the world converted to represent differential changes of height.

The network 106 includes a communication system that connects computers (or devices) by wire, cable, fiber optic and/or wireless link facilitated by various types of well-known network elements, such as hubs, switches, routers, and the like. The network 106 may be a part of the Intranet using various communications infrastructure, such as Ethernet, Wi-Fi, a personal area network (PAN), a wireless PAN, Bluetooth, Near field communication, and the like.

When a user on user device 102 sends a message, for example an email or MMS message, the message 140 is received on location identification server 104. The message 140 includes an image 142. The image 142 is extracted from the message 140. If the image 142 includes location information, such as global positioning system (GPS) coordinates, the coordinates may be stored with the image 142 for future training of machine learning models. However, if the image 142 does not include location information, a depth map generator 146 identifies how far each pixel of the image 142 is from the camera lens of the camera used to capture the image 142. The depth map generator 146 also identifies the height of each pixel from ground level. The result is the depth map 148. Next, any object that is deemed to be too small to be a geographic feature is removed from the depth map 148. Groups of pixels that are of the same height and distance that are too few to be of significance, for example street signs, cars, and the like, are removed from the depth map 148. At this point, the depth map 148 includes outlines and gaps. The depth map 148 is then rotated 90 degrees vertically to be looking down on the image 142. The gaps, or missing information in the depth map 148 is reconstructed based on the heights and distances of features on other parts of the depth map 148. The resulting image topographic map 150 is then modified wherein pixels of the image 142 are represented at a set of differentiating heights. The modified image topographic map 150 is then compared with a global topographic map 152. The most likely match between the image topographic map 150 and the area of the global topographic map 152 is determined to be the location in the image 142.

Figure 2:
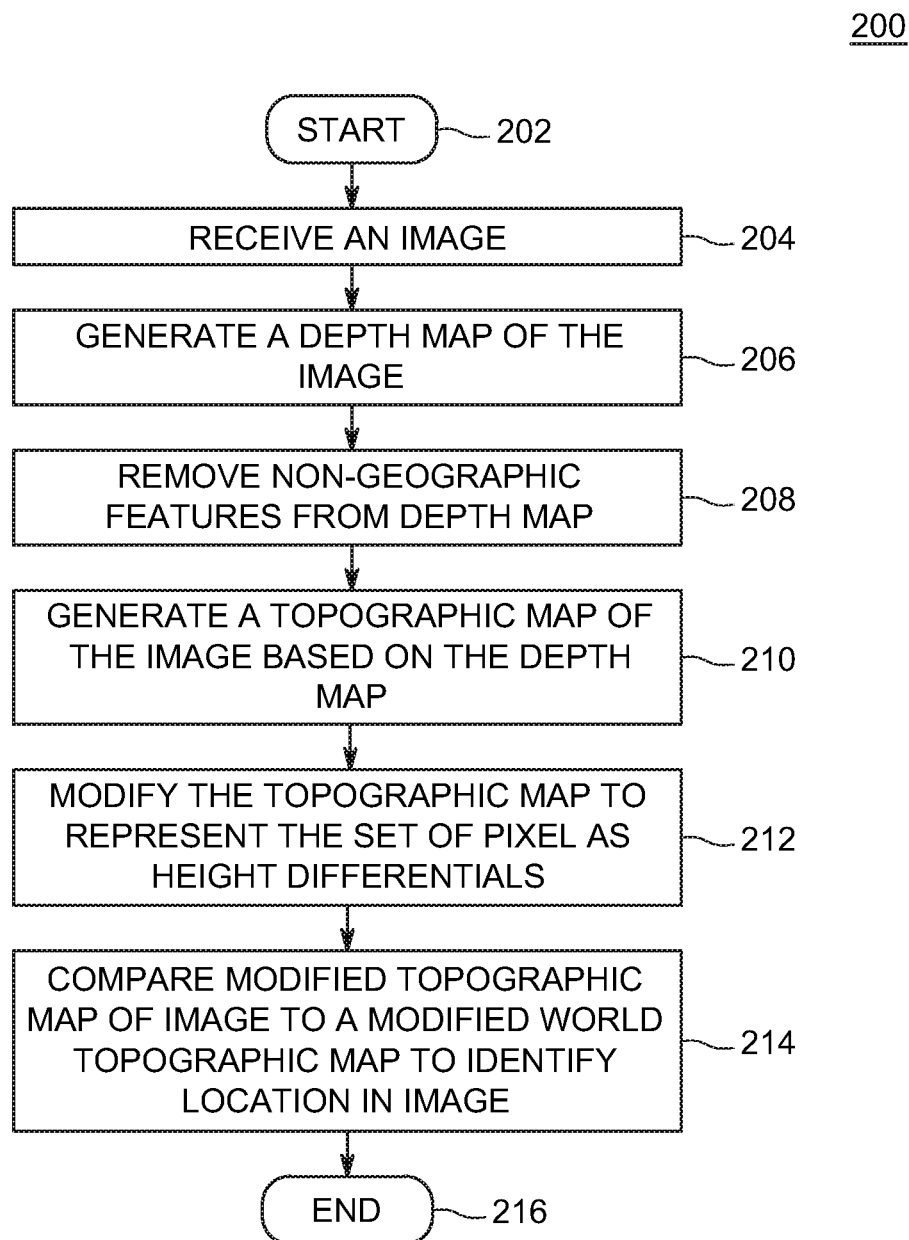
FIG. 2 depicts a flow diagram of a method for identifying locations in photographs using topographic techniques, according to one or more embodiments of the invention.

FIG. 2 depicts a flow diagram of a method 200 for identifying locations in photographs using topographic techniques, according to one or more embodiments of the invention. Prior to the start of method 200 a message is received that includes an image, where the image does not include any information identifying the location in the image. The method 200 starts at step 202 and proceeds to step 204.

At step 204, an image is received. The image is an outdoor scene, where the latitude and longitude of the outdoor location are unknown.

At step 206, a depth map is generated of the image using depth mapping artificial intelligence (AI). For each pixel of the image, the height above the camera lens, and distance from the camera lens, of the camera that captured the image is determined. In some embodiments, a monocular depth estimator may be used if the image is a single image. In some embodiments, a stereo depth estimator may be used if the image is a stereo image (i.e., an image intended to give a three-dimensional visual impression). The depth mapping AI provides the estimated distance of pixels in the image represented as a relative value, in relation to the other pixels in the image. The depth map includes a data structure where every pixel in the image exists on a three-dimensional co-ordinate system (x, y, z), where x and y describe the location of the pixel in the image and z is the estimated value for the relative distance of the pixel from the camera.

At step 208, objects deemed too small to be geographic features are removed from the depth map. This cleaning up of the image helps improve the accuracy of the location identification. Groups of pixels that are identified as being the same height and/or distance on the depth map are identified. Groups that are determined to be smaller than a predefined size for example, less than three meters, are determined to be too small to be geographic features, such as groups that could be signs, street lights, cars, and the like, are removed from the depth map. In some embodiments, objects that are closer than a predefined distance are removed. In such embodiments, each pixel may be processed in a linear fashion. If the pixel is estimated to be closer than the predefined distance, the z value is replaced by the next value that is farther than that estimated distance.

At step 210, gaps in the depth map are filled in to create a topographic map of the image. The depth map is rotated 90 degrees. This creates a view of the location from the sky. Since the image was taken from a single perspective, a view from the top is missing height and distance information when viewed from the top. As such the heights and distances already known for the image are used to reconstruct the height and distance information missing from the image.

At step 212, the topographic map is modified such that the pixels are represented as a set of differentiating heights. For example, if a first pixel is determined to be 100 meters high and a second pixel next to the first pixel is determined to be 97 meters high, the first pixel may have a height of zero and the second pixel would have a height of −3, signifying the difference in the height. The z co-ordinate of the image is converted to vectors containing the differential rate of change in height. This compensates for the unknown altitude of the camera. The topographic slope or rate of change is calculated by the change in relative distance. Started at a corner of the image, for example, the top left corner, the rate of change is calculated as a tuple of the difference from the neighboring two pixels (i.e., the pixel to the left and the pixel above). Inverted slope data (items higher in the image) may be discarded as these items are likely to be clouds or artifacts in the processing.

At step 214, the modified topographic map of the image is compared to a global topographic map of the world. An area of the global topographic map of the world that matches the modified topographic map of the image is determined to be the location of the image. Topographic maps are typically stored in two different ways, specifically digital elevation models or point clouds generally from Light Detection and Ranging (LiDAR) data. Neither of these formats are directly comparable to the slope data generated from the original image. As such the elevation maps are converted to slop vectors. Since the orientation of the original image is not known, the slope from each point on the topographic map to each adjacent point is calculated. The slope rate of change is expressed as a ratio of heights of the two related points. The slope data generated from the image and the slope data generated from the elevation model are compared for similarities, checking for each of the potential rotations of the image. In some embodiments, checks may be used to calculate whether the match is within x %, where x % is a predetermined percentage for a variable fitness check. When processing is complete, a probabilistic location match is determined.

At step 216, the probable location of the image is stored with the image and the method ends at step 218.

Figure 3:
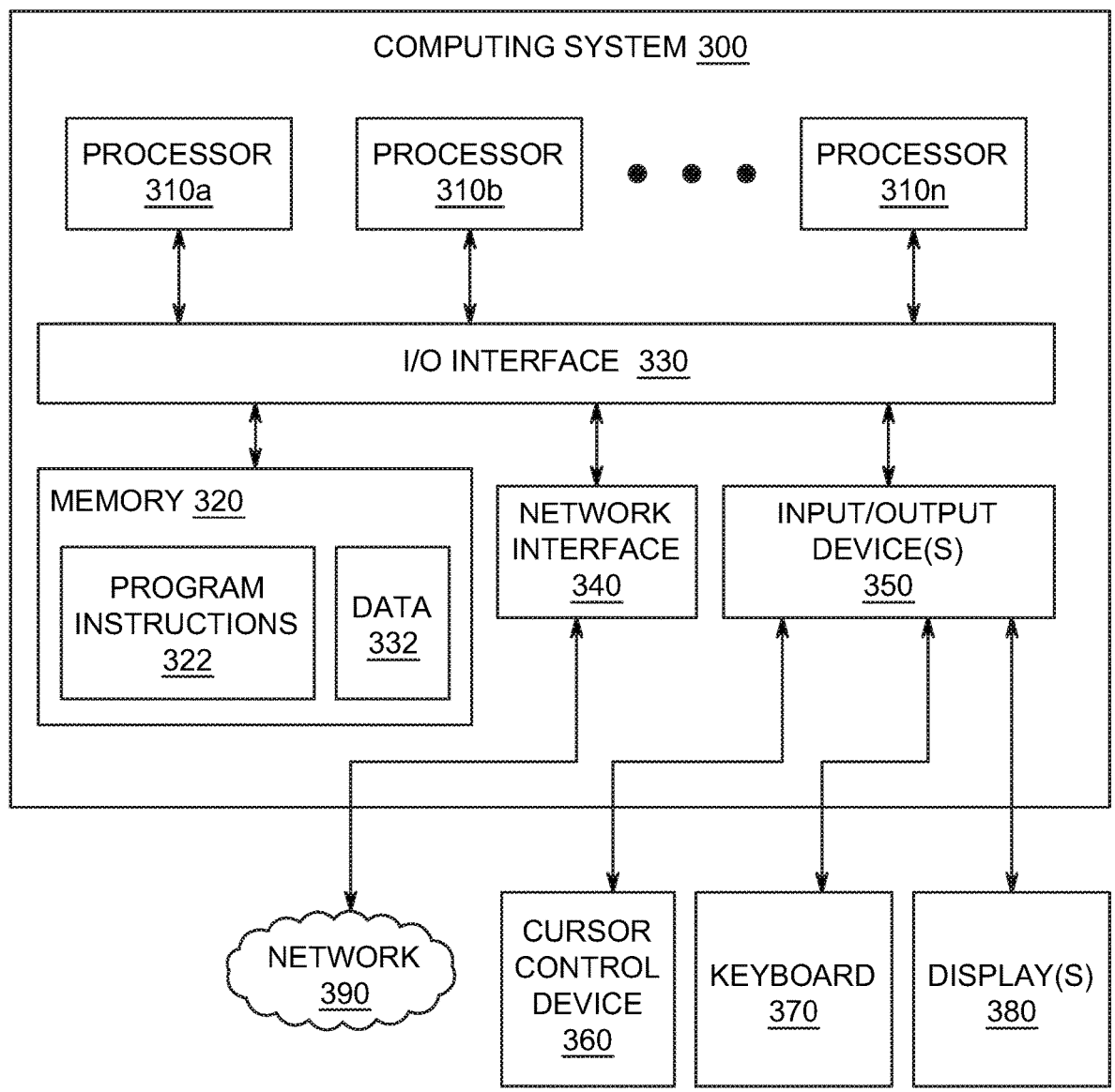
FIG. 3 depicts a computer system that can be utilized in various embodiments of the present invention to implement the computer and/or the display, according to one or more embodiments of the invention.

FIG. 3 depicts a computer system that can be used to implement the method of FIG. 2 in various embodiments of the present invention. Various embodiments of method and system for identifying locations in photographs using topographic techniques, as described herein, may be executed on one or more computer systems, which may interact with various other devices. One such computer system is computer (or computing) system 300 illustrated by FIG. 3, which may in various embodiments implement any of the elements or functionality illustrated in FIGS. 1-2. In various embodiments, computer system 300 may be configured to implement methods described above. The computer system 300 may be used to implement any other system, device, element, functionality or method of the above-described embodiments. In the illustrated embodiments, computer system 300 may be configured to implement method 200, as processor-executable executable program instructions 322 (e.g., program instructions executable by processor(s) 310) in various embodiments.

In the illustrated embodiment, computer system 300 includes one or more processors 310 coupled to a system memory 320 via an input/output (1/0) interface 330. Computer system 300 further includes a network interface 340 coupled to 1/0 interface 330, and one or more input/output devices 350, such as cursor control device 360, keyboard 370, and display(s) 380. In various embodiments, any of components may be utilized by the system to receive user input described above. In various embodiments, a user interface (e.g., user interface) may be generated and displayed on display 380. In some cases, it is contemplated that embodiments may be implemented using a single instance of computer system 300, while in other embodiments multiple such systems, or multiple nodes making up computer system 300, may be configured to host different portions or instances of various embodiments. For example, in one embodiment some elements may be implemented via one or more nodes of computer system 300 that are distinct from those nodes implementing other elements. In another example, multiple nodes may implement computer system 300 in a distributed manner.

In different embodiments, computer system 300 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 300 may be a uniprocessor system including one processor 310, or a multiprocessor system including several processors 310 (e.g., two, four, eight, or another suitable number). Processors 310 may be any suitable processor capable of executing instructions. For example, in various embodiments processors 310 may be general-purpose or embedded processors implementing any of a variety of instruction set architectures (ISAs), such as the x96, PowerPC, SPARC, or MIPS ISAs, or any other suitable ISA. In multiprocessor systems, each of processors 310 may commonly, but not necessarily, implement the same ISA.

System memory 320 may be configured to store program instructions 322 and/or data 332 accessible by processor 310. In various embodiments, system memory 320 may be implemented using any suitable memory technology, such as static random access memory (SRAM), synchronous dynamic RAM (SDRAM), nonvolatile/Flash-type memory, persistent storage (magnetic or solid state), or any other type of memory. In the illustrated embodiment, program instructions and data implementing any of the elements of the embodiments described above may be stored within system memory 320. In other embodiments, program instructions and/or data may be received, sent or stored upon different types of computer-accessible media or on similar media separate from system memory 320 or computer system 300.

In one embodiment, 1/0 interface 330 may be configured to coordinate 1/0 traffic between processor 310, system memory 320, and any peripheral devices in the system, including network interface 340 or other peripheral interfaces, such as input/output devices 350, In some embodiments, 1/0 interface 330 may perform any necessary protocol, timing or other data transformations to convert data signals from one component (e.g., system memory 320) into a format suitable for use by another component (e.g., processor 310). In some embodiments, 1/0 interface 330 may include support for devices attached through various types of peripheral buses, such as a variant of the Peripheral Component Interconnect (PCI) bus standard or the Universal Serial Bus (USB) standard, for example. In some embodiments, the function of 1/0 interface 330 may be split into two or more separate components, such as a north bridge and a south bridge, for example. Also, in some embodiments some or all of the functionality of 1/0 interface 330, such as an interface to system memory 320, may be incorporated directly into processor 310.

Network interface 340 may be configured to allow data to be exchanged between computer system 300 and other devices attached to a network (e.g., network 390), such as one or more external systems or between nodes of computer system 300. In various embodiments, network 390 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 350 may, in some embodiments, include one or more display terminals, keyboards, keypads, touch pads, scanning devices, voice or optical recognition devices, or any other devices suitable for entering or accessing data by one or more computer systems 300. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

In some embodiments, the illustrated computer system may implement any of the methods described above, such as the method illustrated by the flowchart of FIG. 2. In other embodiments, different elements and data may be included.

Those skilled in the art will appreciate that computer system 300 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 300 may be transmitted to computer system 300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DOR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for identifying locations in photographs using topographic techniques, comprising:
receiving an image;
in response to receiving the image, generating a depth map of the image;
generating a topographic map based on the depth map; and
comparing the topographic map to a global topographic map to determine a location of the image;
wherein the image is an outdoor scene wherein the location of the image is unknown.

2. The method of claim 1, further comprising removing non-geographic features from the depth map.

3. The method of claim 1, wherein the depth map identifies for each pixels of the image, a height and distance from a camera lens of a camera that captures the image.

4. The method of claim 1, wherein non-geographic features are identified as small groups of pixels at a same height and distance on the depth map.

5. The method of claim 1, wherein generating the topographic map based on the depth map comprises:
rotating the depth map 90 degrees to view the depth map from a sky view perspective;
identifying gaps in height and distance information from the depth map; and
filling in missing height and distance information using heights and distances already known for the image.

6. The method of claim 1, further comprising modifying the global topographic map to represent each pixel by height differential.

7. The method of claim 1, further comprising storing the location of the image as the location on the global topographic map that matches the topographic map of the image.

8. A system for identifying locations in photographs using topographic techniques, comprising:
a) at least one processor;
b) at least one input device; and
least one storage device storing processor-executable instructions which, when executed by the at least one processor, perform a method including:
receiving an image taken from a single perspective;
in response to receiving the image, generating a depth map of the image;
generating a topographic map based on the depth map; and
comparing the topographic map to a global topographic map to determine a location of the image;
wherein the image is an outdoor scene wherein the location of the image is unknown; and
wherein non-geographic features are identified as small groups of pixels at a same height and distance on the depth map.

9. The system of claim 8, further comprising removing non-geographic features from the depth map.

10. The system of claim 8, wherein the depth map identifies for each pixels of the image, a height and distance from a camera lens of a camera that captures the image.

11. The system of claim 8, wherein generating the topographic map based on the depth map comprises:
rotating the depth map 90 degrees to view the depth map from a sky view perspective;
identifying gaps in height and distance information from the depth map; and
filling in missing height and distance information using heights and distances already known for the image.

12. The system of claim 8, further comprising modifying the global topographic map to represent each pixel by height differential.

13. The system of claim 8, further comprising storing the location of the image as the location on the global topographic map that matches the topographic map of the image.

14. A non-transitory computer readable medium for storing computer instructions that, when executed by at least one processor causes the at least one processor to perform a method for identifying locations in photographs using topographic techniques, comprising:
receiving an image;
in response to receiving the image, generating a depth map of the image;
generating a topographic map based on the depth map; and
comparing the topographic map to a modified global topographic map to determine a location of the image;
wherein the image is an outdoor scene wherein the location of the image is unknown; and
wherein the depth map identifies for each pixels of the image, a height and distance from a camera lens of a camera that captures the image.

15. The non-transitory computer readable medium of claim 14, further comprising removing non-geographic features from the depth map.

16. The non-transitory computer readable medium of claim 14, wherein non-geographic features are identified as small groups of pixels at a same height and distance on the depth map.

17. The non-transitory computer readable medium of claim 14, wherein generating the topographic map based on the depth map comprises:
rotating the depth map 90 degrees to view the depth map from a sky view perspective;
identifying gaps in height and distance information from the depth map; and
filling in missing height and distance information using heights and distances already known for the image.

18. The non-transitory computer readable medium of claim 14, further comprising modifying the global topographic map to represent each pixel by height differential.

* * * * *